United States Patent [19]

Van Broekhoven

[11] 3,974,305

[45] Aug. 10, 1976

[54] TREATMENT OF $Sr_5(PO_4)_3Cl$:Eu LUMINESCENT MATERIAL TO IMPROVE FLUORESCENT LAMP WHICH USES MATERIAL

[75] Inventor: Jacob Van Broekhoven, North Caldwell, N.J.

[73] Assignee: Westinghouse Electric Corporation, Pittsburgh, Pa.

[22] Filed: June 11, 1974

[21] Appl. No.: 478,549

[52] U.S. Cl. .......................... 427/67; 252/301.4 P
[51] Int. Cl.² .......................................... H01J 61/35
[58] Field of Search.......... 117/335 E; 252/301.4 P; 427/67

[56] References Cited
UNITED STATES PATENTS

| | | | |
|---|---|---|---|
| 3,470,106 | 9/1969 | Vodoklys et al. | 252/301.4 P |
| 3,663,473 | 5/1972 | Sausville | 252/301.4 P |
| 3,694,371 | 9/1972 | Panson et al. | 252/301.4 P |
| 3,709,826 | 1/1973 | Pitt et al. | 252/301.4 P |
| 3,755,187 | 8/1973 | Nagy | 252/301.4 P |
| 3,773,681 | 11/1973 | Vodoklys | 252/301.4 P |

*Primary Examiner*—Bernard D. Pianalto
*Attorney, Agent, or Firm*—W. D. Palmer

[57] ABSTRACT

To improve the performance of fluorescent lamps which use strontium chloroapatite activated by a divalent europium as a luminescent material, prior to coating onto the lamp envelope, the luminescent material is washed with an aqueous fluoride solution and then rinsed to remove residual soluble fluoride.

4 Claims, 2 Drawing Figures

```
┌─────────────────────────────────────────────────────┐
│ THOROUGHLY WETTING Sr₅(PO₄)₂Cl:Eu PHOSPHOR          │
│ WITH AQUEOUS SOLUTION OF FLUORIDE SALT              │
└─────────────────────────────────────────────────────┘
                          │
┌─────────────────────────────────────────────────────┐
│ WATER RINSE PHOSPHOR TO REMOVE ANY                  │
│ RESIDUAL FLUORIDE SALT                              │
└─────────────────────────────────────────────────────┘
                          │
┌─────────────────────────────────────────────────────┐
│ COAT PHOSPHOR ONTO LAMP ENVELOPE WITHOUT            │
│ ALTERING PARTICLE SIZE THEREOF                      │
└─────────────────────────────────────────────────────┘
```

TREATMENT OF SR$_5$(PO$_4$)$_3$CL:EU LUMINESCENT MATERIAL TO IMPROVE FLUORESCENT LAMP WHICH USES MATERIAL

BACKGROUND OF THE INVENTION

This invention generally relates to a particular phosphor which is intended to be used in fluorescent lamps and, more particularly, to a method for treating the phosphor so that the performance of the fluorescent lamp which incorporates this phosphor will be improved.

Strontium chloroapatite activated by divalent europium is now a commercial luminescent material and is described in detail in copending application Ser. No. 726,464, filed May 3, 1968, and owned by the present assignee. Such a luminescent material is a very efficient blue-emitting phosphor and is particularly useful as a component in phosphor blends and for special applications such as the treatment of infantile hyperbilirubinemia. The use of this phosphor in the latter application is described in U.S. Pat. No. 3,658,068 dated Apr. 25, 1972.

When the foregoing strontium chloroapatite phosphor is incorporated in fluorescent lamps as a coating on the inner surface of the lamp envelope, the performance of the resulting lamp is quite variable. More specifically, the output of the lamps after they have been operated for 100 hours is apt to diminish considerably and the luminosity can drop as much as 25% during the first 100 hours of operation. In some cases this drop in luminosity is not as severe, but as a general rule, this excessive drop in luminosity will be manifested during the first 100 hours of operation. This has limited the use of fluorescent lamps which incorporate this phosphor.

BRIEF SUMMARY OF THE INVENTION

The performance of low-pressure, positive-column fluorescent discharge devices which incorporate strontium chloroapatite activated by divalent europium as a luminescent material is improved by treating the luminescent material prior to incorporating it in a lamp. In accordance with this treatment, prior to envelope coating, the luminescent material is throughly wetted with an aqueous solution of ionizable fluoride salt wherein the flourine iron in this solution is present in amount of from 0.2 gram to 50 grams per liter of water. The wetted luminescent material is then thoroughly water rinsed to remove any residual soluble fluoride salt therefrom, and thereafter the rinsed luminescent material is coated onto the envelope without altering the particle size thereof.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENT

The preparation of the present phosphor is set forth in detail in aforementioned copending application Ser. No. 726,464, filed May 3, 1968. Briefly, there is mixed 0.6 mole SrHPO$_4$, 0.27 mole of ScCO$_3$, 0.11 mole of SrCl$_2$, and 0.02 mole of EuCO$_3$. Added to this raw mix is 0.25 mole of additional SrCl$_2$ which serves as a flux during firing. The raw mix is then fired in a reducing atmosphere, for example a 90% nitrogen-10% hydrogen atmosphere, at from 900°C to 1200°C and preferably at 1100°C for about 3 hours. The reducing atmosphere insures that the europium is incorporated into the phosphor in the divalent state. The use of excess strontium chloride results in a sintered material which, after cooling, is broken up and leached with distilled water to remove residual soluble strontium chloride. The powdery luminescent composition which remains after leaching is preferably passed through a No. 325 mesh screen.

In accordance with the present invention, the phosphor is first wet milled in water to a proper particle size and is then filtered. The resulting filter cake is then stirred into an aqueous solution of an ionizable flouride salt wherein the fluorine ion in the solution is present in amounts of from 0.2 gram to 50 grams per liter of water, and preferably from about 0.5 gram to about 10 grams per liter of water. Any ionizable fluoride salt can be used in aqueous solution in the treatment of the phosphor although sodium flouride or ammonium fluoride are preferred. The time the phosphor is stirred in the fluoride solution is not critical. As a specific example, 400 grams of phosphor, which is milled to a particle diameter of about eight microns to about twelve microns, suitable for coating onto the lamp envelope, is placed in one liter of water having dissolved therein approximately two grams of flouride ion, and the resulting slurry is stirred for ten minutes. The foregoing treatment thoroughly wets the phosphor with the fluoride solution.

After the stirring, the phosphor is separated from the fluoride solution and is water rinsed in order to remove any residual soluble fluoride salt. As a specific example, the phosphor is water washed and decanted for five times. After the final water wash, the phosphor can be dried preparatory to lamp coating by a spray drying technique or it can be washed in alcohol in order to remove residual water. The dried phosphor is then screened through a No. 325 mesh sieve in order to remove any residual large particles and it is then coated onto the inner surface of the fluorescent lamp envelope. A suitable lamp coating technique is disclosed in application Ser. No. 170,018, filed Aug. 9, 1971, and owned by the present assignee, now U.S. Pat. No. 3,833,392 dated Sept. 3, 1974.

Figure 1:
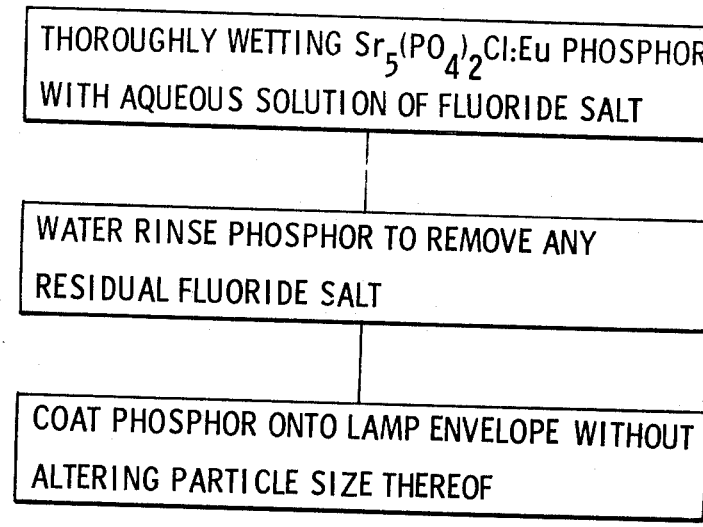
FIG. 1 is a flow diagram setting forth the basic steps of the present phosphor treatment.
Figure 2:
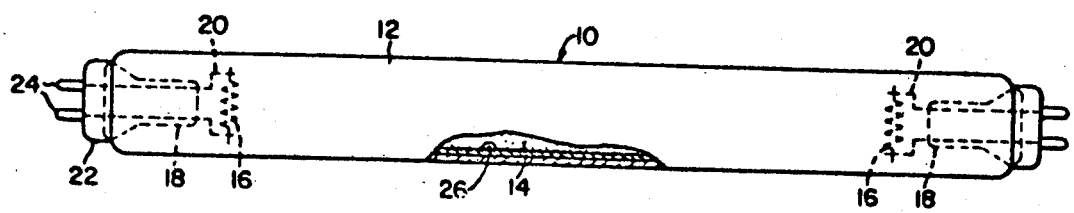
FIG. 2 is an elevational view, partly in section, showing a fluorescent lamp which incorporates phosphor treated in accordance with the present invention.

In FIG. 2 is shown the completed fluorescent lamp 10 which generally comprises a tubular vitreous envelope 12 coated internally with a layer 14 of the phosphor which has been treated in accordance with the present invention. Sealed at each end of the envelope 12 are mounts each comprising an electrode 16, re-entrant stem press 18, and lead-in conductors 20. Base caps 22 and base pins 24 are provided at the envelope ends and the lamp 10 contains a small charge of mercury 26 and inert ionizable starting gas such as 4 torrs of argon, as is conventional.

A fluorescent lamp which incorporates the untreated phosphor will have an initial or "zero" hour output which is about equivalent to the "zero" hour output of the lamp which incorporates the treated phosphor. After about 100 hours operation, however, the lamp which incorporates the untreated phosphor will normally display an output which has decreased anywhere from 10% to 25%. Lamps which incorporate the treated phosphor, in contrast, will display a 100 hour output which decreases less than 9% as compared to the "zero" hour output, and a typical decrease in output after 100 hours of operation will be about 4%.

The effect of the present treatment on the lumen maintenance of the phosphor and thus the performance of the fluorescent lamp which incorporates the phosphor is not clearly understood. It is theorized that a small part of the chlorine atoms proximate the surface of the phosphor particles are displaced by flourine which apparently is more stable in this particular phosphor under lamp operating conditions. Whatever the mechanism involved, the maintenance of light emission is substantially improved. If a small amount of fluorine is incorporated into the phosphor as it is initially prepared, however, the output of the resulting lamp will be substantially decreased. If the phosphor is milled after the present treatment in order to modify its particle size and shape, and thereby remove the effects of the present surface treatment, the improved results are not obtained. Thus it appears clear that some sort of surface modification of the phosphor is being effected by the present treatment.

What I claim is:

1. The method of improving the performance of a low-pressure, positive-column fluorescent discharge device having a elongated envelope and incorporating finely divided strontium chloroapatite activated by divalent europium as a luminescent material coating on the inner surface of said envelope, which method consists essentially of:
   a. prior to envelope coating, thoroughly wetting said luminescent material with an aqueous solution of ionizable fluoride salt, wherein the fluorine ion in said solution is present in amount of from 0.2 gram to 50 grams per liter of water;
   b. water rinsing said wetted luminescent material to remove any residual soluble fluoride salt therefrom; and
   c. coating said rinsed luminescent material onto said envelope without altering the particle size of said luminescent material.

2. The method as specified in claim 1, wherein the fluoride ion in said solution is present in amount of from about 0.5 gram to about 10 grams per liter of water.

3. The method as specified in claim 1, wherein said fluoride salt is one of sodium fluoride or ammonium fluoride.

4. The method as specified in claim 1, wherein after water rinsing and prior to coating, said luminescent material is dried with alcohol and then screened to remove therefrom any overly large particles.

* * * * *